United States Patent [19]

Wakeman

[11] Patent Number: 5,134,843
[45] Date of Patent: Aug. 4, 1992

[54] TELEMETRY CARRIER RING AND SUPPORT

[75] Inventor: Thomas G. Wakeman, Lawrenceburg, Ind.

[73] Assignee: General Electric Company, Cincinnati, Ohio

[21] Appl. No.: 596,653

[22] Filed: Oct. 10, 1990

[51] Int. Cl.$^5$ .............................................. F02G 1/00
[52] U.S. Cl. ................................. 60/39.33; 415/118
[58] Field of Search ............... 60/39.33, 226.1, 39.162, 60/268; 415/118; 416/61; 374/144, 145; 356/426; 340/870.01

[56] References Cited

U.S. PATENT DOCUMENTS 3,638,428 2/1972 Shipley et al. ................... 60/226.1
4,712,372 12/1987 Dickey et al. .................... 60/39.281

*Primary Examiner*—Louis J. Casaregola
*Assistant Examiner*—Howard R. Richman
*Attorney, Agent, or Firm*—Jerome C. Squillaro; John R. Rafter

[57] ABSTRACT

A telemetry carrier ring for use in a gas turbine engine includes an annular support ring connected to the engine and an annular carrier ring coupled to the support ring, each ring exhibiting different growth characteristics in response to thermal and mechanical loading. The carrier ring is coupled to the support ring by a plurality of circumferentially spaced web members which are relatively thin in an engine radial direction to provide a predetermined degree of radial flexibility. the web members have a circumferential width and straight axial line of action selected to transfer torque and thrust between the support ring and the carrier ring without substantial deflection. The use of the web members with radial flexibility provides compensation between the support ring and the carrier ring since the carrier ring grows at a different rate than the supporting ring.

15 Claims, 2 Drawing Sheets

TELEMETRY CARRIER RING AND SUPPORT

The invention herein described was made in the performance of work under a NASA contract and is subject to the provisions of Section 305 of the National Aeronautics and Space Act of 1958, Public Law 85-568 (72 Stat. 435; 42 USC 2457).

BACKGROUND OF THE INVENTION

The present invention relates to gas turbine engines and, more particularly, to a method and apparatus for supporting a load carrying ring in such an engine.

In gas turbine engine development, it is often necessary to obtain various measurements of engine characteristics during engine operation. Such measurements require installation of various measurement devices, such as strain gauges and thermocouples, in the engine. Some of these devices must be coupled to rotating components or in rotating sections of such engines and require radio frequency transmitters for transmitting the collected data to appropriate monitoring stations. In at least some instances, the measurement devices are positioned adjacent an outer surface of the engine to provide accessibility, cooling and proximity to stationary components for antenna mounting. The measurement devices must be supported from centrifugal loading in a structure which is relatively light weight in order to minimize its effect on engine dynamics. The structure must be connected to some other rotating part of the engine and thus presents a problem of thermal and mechanical growth mismatch due to high speed rotation and heat generated by the engine turbine, i.e., the engine component and the telemetry support structure have different thermal and mechanical growth rates.

Another problem with positioning of telemetry devices within the gas turbine engine is that the devices must be supplied with cooling air to maintain their operating temperatures within predetermined limits. In general, most such telemetry devices are limited to about 180° F. The air temperature within the engine between the engine turbine and the outer cowl may vary from 400° to 600° F. Accordingly, it is necessary to provide air from outside the engine for cooling the telemetry devices.

In other applications, a load carrying ring may be stationary but subjected to thermal conditions which cause the ring to "grow" at the rates different from the apparatus to which the ring is connected. Thus, the problem of supporting dead loads, i.e., loads which do not provide structural support, extends to both rotating and non-rotating carrier rings.

BRIEF DESCRIPTION OF THE DRAWINGS

For a better understanding of the present invention, reference may be had to the following detailed description taken in conjunction with the accompanying drawings in which.

DESCRIPTION OF THE PREFERRED EMBODIMENT

Figure 1:
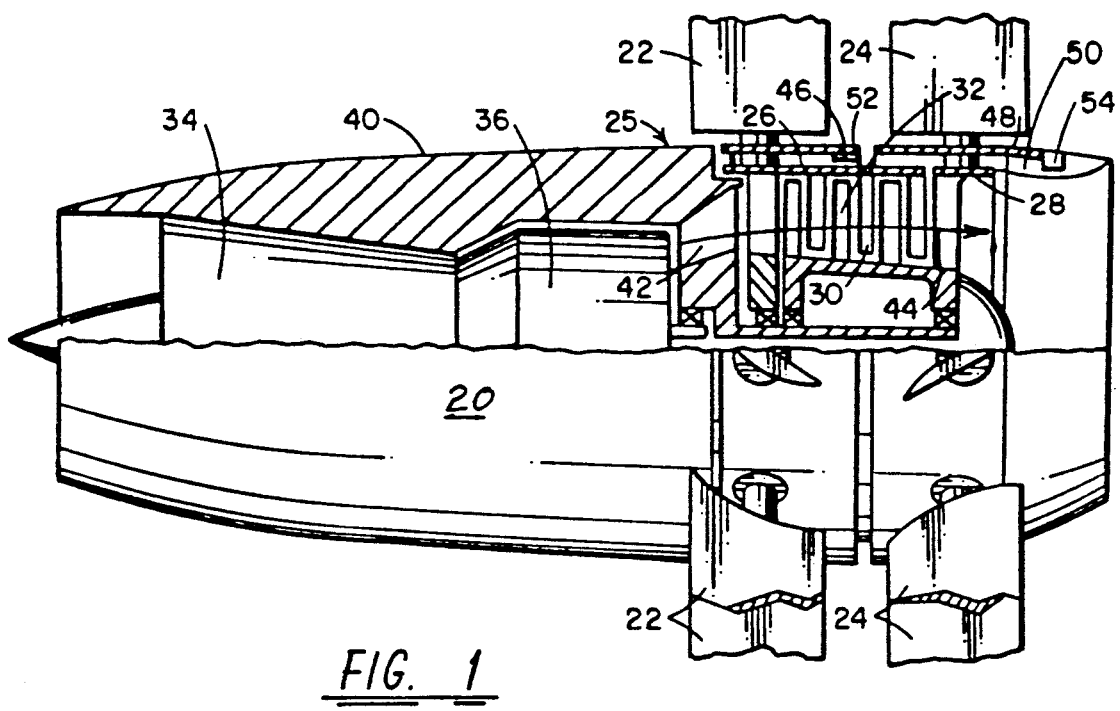
FIG. 1 is a simplified, partial cross-sectional view of one form of gas turbine engine with which the present invention may be used.

FIG. 1 is a simplified, partial illustration of one form of gas turbine engine 20 with which the present invention may be used. The illustrative engine is sometimes referred to as an unducted fan gas turbine engine. Forward and aft counterrotating propulsor blades 22 and 24 are disposed radially outwardly of a power turbine section 25. The power turbine section 25 includes first and second counterrotating rotors 26 and 28. First and second sets of counterrotating turbine blades 30 and 32 are coupled to the first and second rotors 26 and 28, respectively. The forward and aft propulsor blades 22 and 24 are coupled respectively to the first and second rotors 26 and 28 and rotate therewith.

The engine 20 further includes an annular gas flowpath 42 formed through the first and second rotors 26 and 28. Pressurized air from a compressor section 34 is heated in a combustor 36 to form a high energy (high pressure/high temperature) gas stream, denoted generally by arrow 44. The high energy gas stream 44 flows through the rotors 26 and 28 to turn the counterrotating turbine blades 30 and 32 for driving the counterrotating propulsor blades 22 and 24, respectively. A housing or nacelle 40 encompasses the engine 20. First and second cowls or fairings 46 and 48 are positioned radially inwardly of the propulsor blades 22 and 24, and are connected for rotation with the counterrotating rotors 26 and 28, respectively. The first and second fairings 46 and 48 are conformal with nacelle 40 to optimize the flow characteristics of air passing over the engine 20.

For purposes of monitoring various selected operating characteristics of the engine 20, a plurality of telemetry devices are mounted in an engine cavity 50 between the nacelle 40 and the power turbine 25. Preferably, the telemetry devices are mounted in a carrier ring 52 or a carrier ring 54. Two carrier rings are illustrated in the engine 20, each associated, respectively, with one of the two sets of propulsor blades 22 and 24. While the invention is described with respect to a rotating carrier ring containing telemetry devices, it will be appreciated that the carrier ring may not rotate and/or that other types of dead loads, including propulsor blades, could be coupled to the carrier ring. What is described herein is a method and apparatus for supporting carrier rings to other engine components under conditions in which the carrier ring and the supporting components are subjected to different growth rates, either from thermal or mechanical loading effects. In addition, the invention includes a method and apparatus for providing cooling air to devices supported by such carrier rings.

Figure 2:
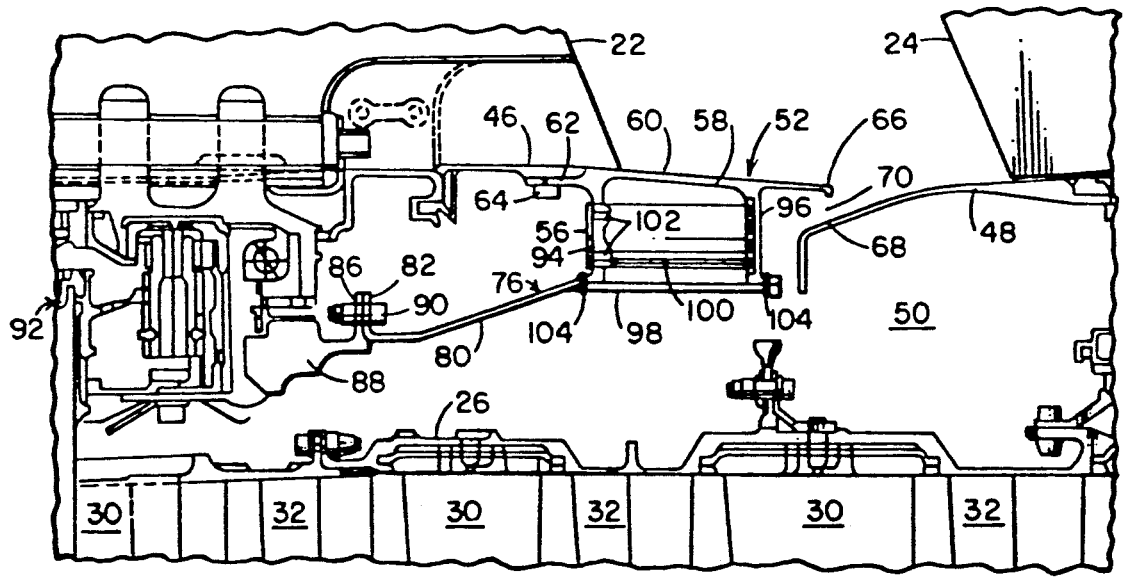
FIG. 2 is an enlarged, partial cross-sectional view of an area of the engine of FIG. 1 showing use of a carrier ring.

Turning now to FIG. 2, there is shown an enlarged, partial sectional view of the area of the engine 20 adjacent the carrier ring 52. The turbine blades 30, 32 are truncated at the lower edge of FIG. 2 with the understanding that these blades are rotatably driven by a hot gas stream, indicated by arrow 44 in FIG. 1, flowing through the turbine. The gas stream 44 may have a temperature in the range of 1100° to 1200° F. The turbine rotor 26 separates the gas stream path from the cavity 50. However, the temperature within cavity 50 from the heat generated by the engine is typically between 400° and 600° F. Thus, some means of cooling the telemetry devices, indicated generally at 56 in ring 52, must be provided to keep the devices within their normal operating range, e.q., at less than about 180° F.

The carrier ring 52 is preferably formed with a substantially rectangular cross-section and has an annular configuration with an outer member 58 having a surface 60 at least generally coextensive with the outer surface of nacelle 40 and fairing 46. Outer member 58 includes a forwardly extending flange 62 having a plurality of circumferentially spaced fasteners 64 for coupling fairing 46 in a sealing interface with carrier ring 52. Carrier ring 52 also includes a trailing flange 66 which overlays but is spaced from forward edge 68 of aft fairing 48. The flange 66 maintains the aerodynamics of the nacelle while defining an opening 70 for cooling air exiting cavity 50. A detailed description of cooling air flow in cavity 50 may be had by reference to U.S. Pat. No. 5,039,278, assigned to the assignee of the present invention.

Figure 3:
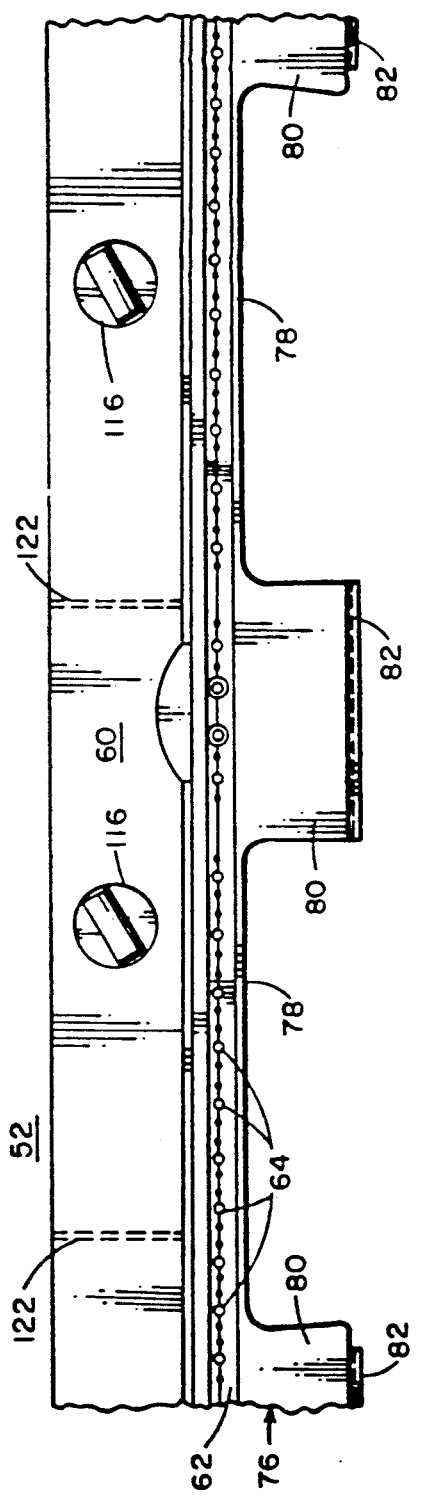
FIG. 3 is a radial view of a section of a carrier ring with attached supporting member.

The carrier ring 52 is mechanically supported in the engine 20 by an annular support member 76. Referring briefly to FIG. 3, a portion of the carrier ring 52 and support member 76 is shown in a radial view as they would appear if flattened into a planar form. The member 76 comprises an annular flange section 78 which may be formed integrally with carrier ring 52 or be fastened to the ring 52 by means well known in the art. A plurality of circumferentially spaced web members 80 extend from and are integral with the annular flange section 78. Each web member 80 has an end 82 (see FIG. 2) adapted for attachment to a support frame 88 in the engine. The flange section 78 is extended sufficiently from the ring 52 to act as a heat shield for deflecting heat from the telemetry devices.

Referring again to FIG. 2, the ends 82 of the web members 80 are preferably formed as radially outwardly extending flanges removably attached to a mating radially outwardly extending flange 86 of an annular support frame 88 such as by bolts 90. The frame 88 is part of the blade retention apparatus 92 which supports the propulsor blades 22 and is coupled to the turbine rotor 26. The carrier ring 52 is preferably a box-like structure having, in addition to the outer member 58, a forward panel 94, an aft panel 96, and a radially inner panel 98. The telemetry devices 56 may be enclosed in housings or support tubes 100 inserted through apertures in the forward panel 94 into the ring 52. The housings 100 may include a forward flange (not shown) which is attachable to the forward panel 94 by bolts or screws at locations 102. The radially inner panel 98 may be attached to the carrier ring 52 by fasteners 104 (rivets or screws) and serves to reduce the heating effect on the devices 56 by blocking the flow of heat, either by convection or radiation, into the cavity within the carrier ring.

Figure 4:
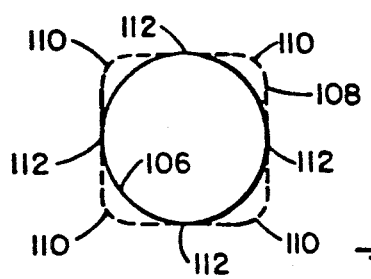
FIG. 4 is a simplified representation of the effect of thermal and/or mechanical loading on a carrier ring.

Turning now to FIG. 4, there is shown a highly simplified representation of the effect of thermal and/or mechanical loading on a carrier ring subjected to dead loads. The normal shape of the illustrative carrier ring in a plane generally perpendicular to an axis of the ring is indicated by the line 106. The line 108 represents, in exaggerated form, the effects of thermal and/or mechanical loading of the ring. Each of the nodes 110 correspond to a dead load on the ring, e.g., a telemetry device 56. Loading results in a distortion of the ring since the ring is desirably kept at relatively low mass to avoid affecting engine dynamics. However, the structural frame 88 remains relatively undistorted. Thus, the web members 80 must provide a transition between the relatively stable and undistorted frame 88 and the distortable geometry of a ring such as ring 52. In order to minimize web distortion, it is desirable to position the web members 80 such that they connect to ring 52 at locations of least distortion, such as locations indicated at 112. Notwithstanding such positioning, the web members 80 must accommodate radial motion to compensate for differential radial growth between the frame 88 and ring 52. At the same time, the web members 80 must be relatively stiff in the circumferential and axial directions in order to support the ring 52 for rotation and to maintain its relatively axial positioning and concentricity to avoid interference and/or contact with other rotating or non-rotating engine components. Thus, the web members 80 are relatively thin radially but relatively wide circumferentially and are relatively straight line elements axially.

Figure 5:
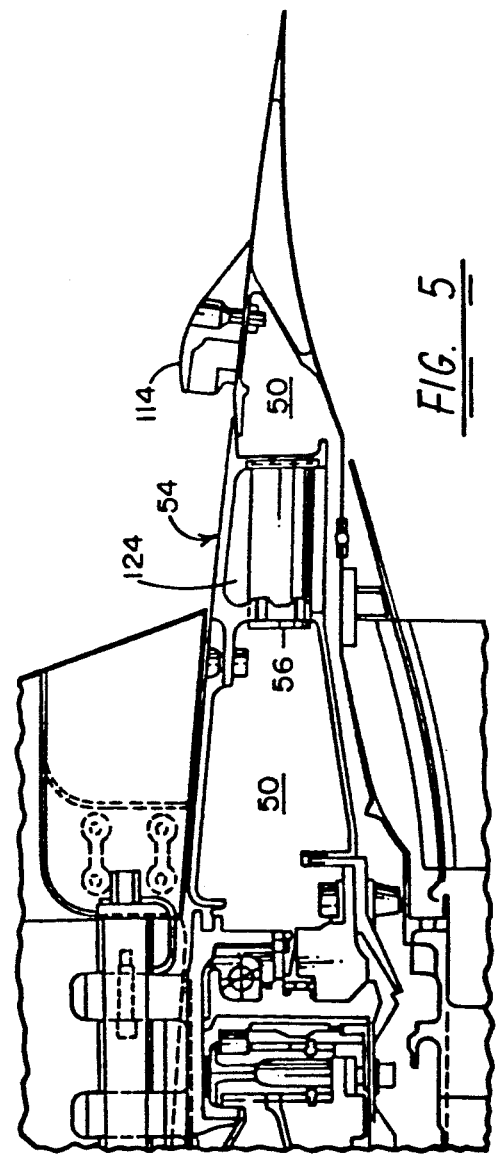
FIG. 5 is a simplified, partial cross-sectional view of one form of carrier ring and cooling arrangement.

FIG. 5 is a simplified, partial view of the area adjacent aft carrier ring 54 and differs primarily in the cooling air flow pattern provided by aft scoop 114. A plurality of air scoops 114 are circumferentially spaced about the engine 20 to collect slip-stream air (at about 120° F. or less) and direct such air into the cavity 50. Air collected by scoops 114 flows around and can flow through the ring 54 before flowing forward of the engine to exit at aperture 70 adjacent ring 52.

Figure 6:
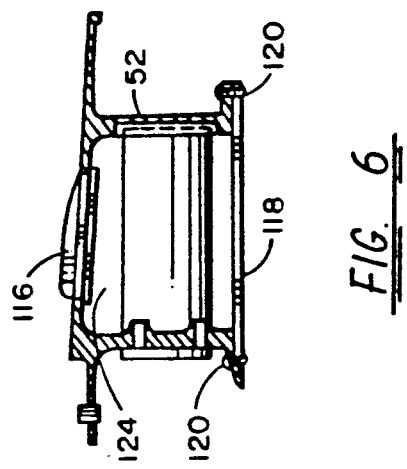
FIG. 6 is a simplified, partial cross-sectional view of another form of carrier ring and cooling arrangement.

An alternate method of providing cooling air to the devices in the carrier rings 52 and 54 is to provide air scoops 116 as shown in FIG. 6 leading directly into the ring interior. However, such arrangement requires partitions or baffles 122 in the rings 52, 54 between scoops 116 to prevent air flow into one scoop and out another scoop as can happen due to air instability when diffusing scoops enter a restricted common cavity. Referring briefly to FIG. 3, a pair of scoops 116 is indicated schematically on the outer surface 60 of ring 52. Baffles 122 are indicated by phantom lines between each adjacent pair of scoops 116. The embodiment of FIG. 6 also shows the use of a U-shaped annular channel to form either of the rings 52, 54 with an annular radially inner panel 118 bolted or riveted to the ring as indicated by fasteners 120 to form a restricted volume cavity 124. The panel 118 is used as a circumferential shield to block heat flow to the telemetry devices in the same manner as panel 98. The use of scoops 116 may be necessary in the forward ring 52 to draw air directly in from the fan slip-stream. However, some cooling is affected by slip-stream air passing over the outer surface of each ring 52, 54 and additional cooling by air collection through scoops 116 and 114 may only be required at high heat load conditions such as occur at take-off.

While the telemetry rings 52, 54 have been shown as hollow, box-like constructions, it could be possible to form solid rings with holes machined out to accept the telemetry devices and thus reduce some of the thermal and mechanical growth problems. However, such rings would be heavy and adversely affect engine operation and dynamics. Accordingly, a feature of the invention is the use of the hollow, light weight structure with tube inserts to contain the telemetry devices.

While the principles of the invention have now been made clear in an illustrative embodiment, it will become apparent to those skilled in the art that many modifications of the structures, arrangements, and components presented in the above illustrations may be made in the practice of the invention in order to develop alternate embodiments suitable to specific operating requirements without departing from the spirit and scope of the invention as set forth in the claims which follow.

What is claimed is:

1. A gas turbine engine including an annular support ring connected to the engine and an annular carrier ring each of which exhibits different radial growth characteristics due to thermal and material differences, and loading on the lower mass carrier ring, and further including means for coupling the carrier ring to the support ring, said coupling means comprising a plurality of circumferentially spaced web member interconnecting the support ring and the carrier ring, each of the web members being sufficiently thin in an engine radial direction to provide a predetermined degree of radial flexibility to compensate for radial growth differences between the support and carrier ring, and each of the web members having a predetermined circumferential width to provide a circumferentially and axially stiff connection in order to transfer torque and thrust between the support ring and the carrier ring without substantial deflection.

2. The gas turbine engine of claim 1 and including a plurality of telemetry loads coupled to and circumferentially spaced about said carrier ring, said carrier ring being radially outwardly deformed during engine operation at segments adjacent said loads due to the relatively low mass of said carrier ring, and substantially non-deformed at segments between said loads, said web members being connected to said carrier ring at preselected locations corresponding to said non-deformed segments of said carrier ring.

3. The gas turbine engine of claim 1 wherein said carrier ring comprises a structure having a hollow, substantially rectangular cross-section, with a radially outer surface at least generally coextensive with an outer surface of the engine, a plurality of telemetry loads being coupled to said carrier ring, the engine further including means for directing cooling air onto the loads and adjacent portions of said carrier ring.

4. The gas turbine engine of claim 3 wherein said means for directing cooling air comprises a plurality of circumferentially spaced air scoops extending radially outward from the outer surface of the engine.

5. The gas turbine engine of claim 4 wherein said scoops are formed in said radially outer surface of said carrier ring.

6. The gas turbine engine of claim 5 and including a plurality of partitions formed within said carrier ring, at least one of said partitions being positioned between each adjacent pair of said scoops.

7. The gas turbine engine of claim 3 and including an annular flange formed integrally with the carrier ring or fastened to said carrier ring adjacent said web members and positioned for deflecting heat either by radiation or convection from said telemetry loads.

8. Apparatus for transferring circumferential torque and thrust between an annular support ring and an annular carrier ring, one of which is relatively stiff and the other of which is relatively flexible, the carrier ring and the support ring demonstrating different variable radial deflections in response to thermal and load variations, said apparatus comprising a plurality of circumferentially spaced web members connected between the support ring and the carrier ring, each of the web members being sufficiently thin in a radial direction to provide for radial motion to compensate for differential radial growth between the support ring and the carrier ring, and each of the web members sufficiently wide to provide axial positioning and concentricity by way of a circumferentially and axially stiff connection between the support ring and the carrier ring.

9. The apparatus of claim 8 wherein the carrier ring comprises a channel section having a radially outer panel and an opposing pair of axially displaced forward and aft panels, said forward panel having an axially and forwardly extending flange at a radially inner edge thereof, said web members comprising axially extending segments of said flange.

10. The apparatus of claim 9 and including a flange extending in an aft direction from said aft panel, said carrier ring further including at least one heat shield extending between said forward panel and said aft panel and fastener means for coupling said heat shield to said carrier ring at said forward and aft panels.

11. The apparatus of claim 10 and including a plurality of circumferentially spaced apertures in said forward panel and a corresponding plurality of support tubes positioned one in each of said apertures, each of said support tubes being adapted for receiving a device for monitoring selected conditions associated with said carrier ring.

12. The apparatus of claim 11 and further including a plurality of said heat shields, each of said heat shields being attached to said carrier ring at a location corresponding to the location of a respective one of said support tubes.

13. The apparatus of claim 12 wherein said support ring and said carrier ring are operatively installed in a gas turbine engine in a cavity between an engine nacelle and an engine rotor, and including means for providing cooling air to said carrier ring.

14. The apparatus of claim 13 wherein said radially outer panel is at least generally coextensive with said nacelle and including a plurality of circumferentially spaced air scoops extending radially outward of said outer panel and opening into said carrier ring for collecting air from external of the engine and directing the air into said carrier ring.

15. The apparatus of claim 14 and further including a plurality of baffles positioned in said carrier ring, at least one of said baffles being positioned between each adjacent pair of said air scoops thereby to prevent diffused air entering in one of the air scoops and exiting an adjacent air scoop.

* * * * *